United States Patent
Grammel, Jr. et al.

(10) Patent No.: US 7,779,866 B2
(45) Date of Patent: Aug. 24, 2010

(54) SEGMENTED TRAPPED VORTEX CAVITY

(75) Inventors: Leonard Paul Grammel, Jr., Cincinnati, OH (US); David Lance Pennekamp, Hamilton, OH (US); Ralph Henry Winslow, Jr., Ross, OH (US)

(73) Assignee: General Electric Company, Schenectady, NY (US)

( * ) Notice: Subject to any disclaimer, the term of this patent is extended or adjusted under 35 U.S.C. 154(b) by 759 days.

(21) Appl. No.: 11/490,559

(22) Filed: Jul. 21, 2006

(65) Prior Publication Data

US 2008/0019822 A1    Jan. 24, 2008

(51) Int. Cl.
*F15C 1/16*    (2006.01)

(52) U.S. Cl. ............................. 137/808; 60/761; 60/800

(58) Field of Classification Search .................... 60/750, 60/761, 799, 800; 137/808
See application file for complete search history.

(56) References Cited

U.S. PATENT DOCUMENTS

| | | | | |
|---|---|---|---|---|
| 4,524,980 A | * | 6/1985 | Lillibridge et al. | ........... 277/641 |
| 5,167,485 A | * | 12/1992 | Starkweather | .............. 415/115 |
| 5,167,488 A | * | 12/1992 | Ciokajlo et al. | ............. 415/175 |
| 5,791,148 A | | 8/1998 | Burrus | |
| 5,857,339 A | | 1/1999 | Roquemore et al. | |
| 6,286,298 B1 | | 9/2001 | Burrus et al. | |
| 6,481,209 B1 | | 11/2002 | Johnson et al. | |
| 6,735,949 B1 | | 5/2004 | Haynes et al. | |
| 6,951,108 B2 | * | 10/2005 | Burrus et al. | .................. 60/746 |
| 7,225,623 B2 | * | 6/2007 | Koshoffer | ..................... 60/776 |
| 7,467,518 B1 | * | 12/2008 | Vermeersch | ................. 60/776 |
| 2007/0044476 A1 | * | 3/2007 | Koshoffer | ..................... 60/776 |

OTHER PUBLICATIONS

AIAA 95-0810, "Performance of a Trapped-Vortex Combuster", 33rd Aerospace Sciences Meeting and Exhibit, Jan. 9-12, 1995 / Reno, NV, 15 pages.

* cited by examiner

*Primary Examiner*—John Rivell
*Assistant Examiner*—Craig M Schneider
(74) *Attorney, Agent, or Firm*—William Scott Andes; Steven J. Rosen

(57) ABSTRACT

An annular trapped vortex cavity assembly segment comprising includes a cavity forward wall, a cavity aft wall, and a cavity radially outer wall therebetween defining a cavity segment therein. A cavity opening extends between the forward and aft walls at a radially inner end of the assembly segment. Radially spaced apart pluralities of air injection first and second holes extend through the forward and aft walls respectively. The segment may include first and second expansion joint features at distal first and second ends respectively of the segment. The segment may include a forward subcomponent including the cavity forward wall attached to an aft subcomponent including the cavity aft wall. The forward and aft subcomponents include forward and aft portions of the cavity radially outer wall respectively. A ring of the segments may be circumferentially disposed about an axis to form an annular segmented vortex cavity assembly.

40 Claims, 7 Drawing Sheets

SEGMENTED TRAPPED VORTEX CAVITY

The Government has rights in this invention pursuant to Contract No. NAS3-01135 awarded by NASA.

BACKGROUND OF THE INVENTION

The present invention relates generally to aircraft gas turbine engines with thrust augmenting afterburners and, more specifically, afterburners with trapped vortex cavities.

High performance military aircraft typically include a turbofan gas turbine engine having an afterburner or augmentor for providing additional thrust when desired particularly for supersonic flight. The turbofan engine includes in downstream serial flow communication, a multistage fan, a multistage compressor, a combustor, a high pressure turbine powering the compressor, and a low pressure turbine powering the fan. A bypass duct surrounds and allows a portion of the fan air to bypass the multistage compressor, combustor, high pressure, and low pressure turbine.

During operation, air is compressed in turn through the fan and compressor and mixed with fuel in the combustor and ignited for generating hot combustion gases which flow downstream through the turbine stages which extract energy therefrom. The hot core gases are then discharged into an exhaust section of the engine which includes an afterburner from which they are discharged from the engine through a variable area exhaust nozzle.

Afterburners are located in exhaust sections of engines which includes an exhaust casing and an exhaust liner circumscribing a combustion zone. Fuel injectors (such as spraybars) and flameholders are mounted between the turbines and the exhaust liner for injecting additional fuel when desired during reheat operation for burning in the afterburner for producing additional thrust. Thrust augmentation or reheat using such fuel injection is referred to as wet operation while operating dry refers to not using the thrust augmentation. The annular bypass duct extends from the fan to the afterburner for bypassing a portion of the fan air around the core engine to the afterburner. This bypass air is mixed with the core gases and fuel from the spraybars prior and ignited and combusted prior to discharge through the exhaust nozzle. The bypass air is also used in part for cooling the exhaust liner.

Various types of flameholders are known and provide local low velocity recirculation and stagnation regions therebehind, in regions of otherwise high velocity core gases, for sustaining and stabilizing combustion during reheat operation. Since the core gases are the product of combustion in the core engine, they are initially hot, and are further heated when burned with the bypass air and additional fuel during reheat operation. Augmentors currently are used to maximize thrust increases and tend to be full stream and consume all available oxygen in the combustion process yielding high augmentation ratios for example about 70%.

A trapped vortex cavity flame stabilizer was developed for afterburners to eliminate the spraybars and flameholders and to stabalize the flame in the afterburner during afterburner operation. The one piece ring trapped vortex cavity acts as a flame stabilizer and is a one piece 360 degree ring structure with radial walls. It is subject to high stresses due to thermal temperature gradients in the radial and circumferential directions and tests have been made and signs of thermal distress have been observed. The ring structure requires thousands of small cooling holes that cannot be easily drilled in a one piece ring structure. The one piece ring trapped vortex cavity is coated with a thermal barrier coating (TBC) which cannot easily be sprayed due to the physical size of the spray nozzle relative to the width and depth of the cavity.

Thus, it is highly desirable to have a trapped vortex cavity for use in an afterburner which has better performance characteristics than previous augmentors and able to withstand the high temperature environment in the afterburner.

BRIEF DESCRIPTION OF THE INVENTION

An annular trapped vortex cavity assembly segment having particular application in a trapped vortex cavity aircraft gas turbine engine afterburner includes a cavity forward wall, a cavity radially outer wall, and a cavity aft wall defining a cavity segment therebetween. A cavity opening extends between the cavity forward and aft walls at a radially inner end of the assembly segment. Radially spaced apart pluralities of air injection first and second holes are disposed through the cavity forward and aft walls respectively.

An exemplary embodiment of the segment includes first and second expansion joint features at distal first and second ends separated by a center section of the annular trapped vortex cavity assembly segment respectively. One exemplary embodiment of the first and second expansion joint features includes first and second slots in circumferentially oppositely facing first and second edges of the first and second ends respectively. The first and second ends are thicker than the center section. Another exemplary embodiment of the first and second expansion joint features includes a first unflared end and a second flared end. One exemplary embodiment of the second flared end is connected to the center section by radially inner and outer bends and another is connected to the center section by a single acute angle bend.

A more particular embodiment of the segment includes attached forward and aft subcomponents. The forward subcomponent includes the cavity forward wall and the aft subcomponent includes the cavity aft wall. The forward and aft subcomponents include forward and aft portions of the cavity radially outer wall respectively. The forward and aft subcomponents may be welded together. The forward and aft subcomponents may be attached together approximately near or at a tangent point of a fillet radius of a fillet between the cavity radially outer wall and the cavity forward wall.

An annular segmented vortex cavity assembly having particular application to an aircraft gas turbine engine afterburner includes a ring of the annular trapped vortex cavity assembly segments circumferentially disposed about an axis forming a segmented trapped vortex cavity within the ring of annular trapped vortex cavity assembly segments. An exemplary embodiment of the assembly includes an expansion joint disposed between each pair of first and second adjacent segments of the annular trapped vortex cavity assembly segments. One exemplary embodiment of the expansion joint includes a slip seal disposed in first and second slots in circumferentially oppositely facing first and second edges of the first and second ends respectively of the pair of first and second adjacent segments. Another exemplary embodiment of the expansion joint includes the first end of each of the segments being unflared and the second end of each of the segments being flared. At least a first portion of the cavity radially outer wall in the first unflared end is radially spaced apart from at least a second portion of the cavity radially outer wall in the second flared end and a cooling air slot is located radially between the first and second portions at each of the joints.

An exemplary embodiment of the assembly includes each of the segments having attached forward and aft subcomponents. The forward subcomponent includes the cavity forward wall, the aft subcomponent includes the cavity aft wall, and the forward and aft subcomponents include forward and aft portions of the cavity radially outer wall respectively. The forward and aft subcomponents are welded or otherwise attached together.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
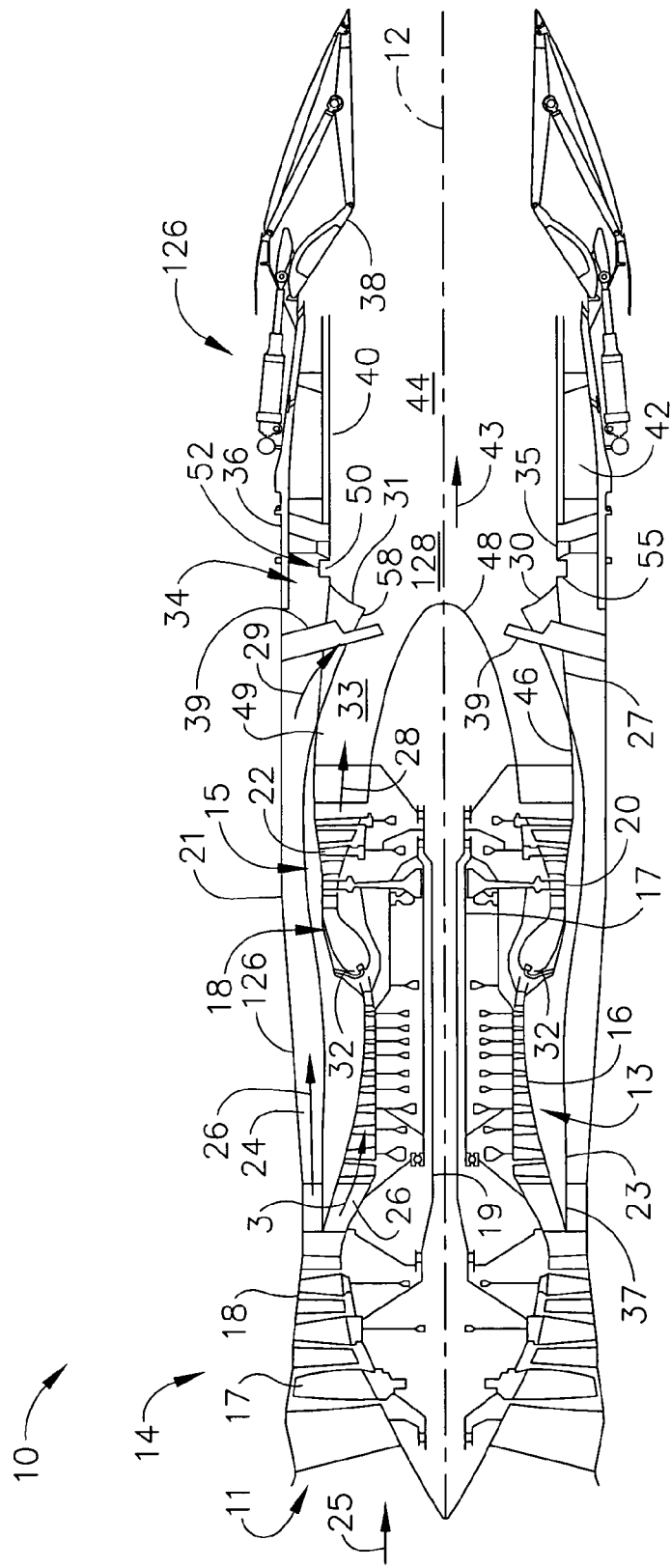
FIG. 1 is an axial sectional view illustration through an exemplary turbofan gas turbine engine having a segmented trapped vortex cavity in an afterburner.

Illustrated in FIG. 1 is an exemplary medium bypass ratio turbofan gas turbine engine 10 for powering an aircraft (not shown) in flight having only one afterburner which is a trapped vortex cavity afterburner 34 located in an exhaust section 126 of the engine. The engine 10 is axisymmetrical about a longitudinal or axial centerline axis 12 and has a fan section 14 upstream of a core engine 13. The core engine 13 includes, in serial downstream flow communication, a multi-stage axial high pressure compressor 16, an annular combustor 18, and a turbine section 15.

The turbine section 15 illustrated herein includes a high pressure turbine 20 suitably joined to the high pressure compressor 16 by a high pressure drive shaft 17. Downstream of the turbine section 15 and the core engine 13 is a multistage low pressure turbine 22 suitably joined to the fan section 14 by a low pressure drive shaft 19. The core engine 13 is contained within a core engine casing 23 and an annular bypass duct 24 is circumscribed about the core engine 13. An engine casing 21 circumscribes the bypass duct 24 which extends from the fan section 14 downstream past the low pressure turbine 22.

Engine air 25 enters the engine through an engine inlet 11 and is initially pressurized as it flows downstream through the fan section 14. A splitter 37 splits the engine air 25 into an inner portion thereof referred to as core engine air 3 which flows through the high pressure compressor 16 for further compression and an outer portion thereof referred to as bypass air 26 which bypasses the core engine 13 and flows through the bypass duct 24. The core engine air 3 is suitably mixed with fuel by fuel injectors 32 and carburetors in the main combustor 18 and ignited for generating hot combustion gases which flow through the turbines 20, 22 and are discharged therefrom as core gases 28 into a diffuser duct 33 aft and downstream of the turbines 20, 22 in the engine 10.

The core engine 13 also includes an annular core outlet 30 and the bypass duct 24 includes an annular bypass duct outlet 27 for respectively discharging the core gases 28 and an injected portion 29 of the bypass air 26 downstream into the exhaust section 126 of the engine 10. A mixer 31 is disposed in the annular bypass duct outlet 27 and includes a plurality of injector chutes 58 extending radially inwardly into the exhaust flowpath 128 from the bypass duct 24. The mixer 31 mixes the core gases 28 and an injected portion 29 of the bypass air 26 resulting in an exhaust gas flow 43 and flows it into the exhaust section 126 and the combustion zone 44 within the exhaust section 126. Other means of mixing the core gases 28 and the injected portion 29 of the bypass air 26 and flowing it into the exhaust section 126 include well known aft variable area bypass injectors. Illustrated herein as exemplary thrust augmentation radially inwardly extending fuel injectors are bluff body thrust augmentation fuel injectors 39 radially disposed within and between the chutes 58 of the mixer 31. See U.S. Pat. No. 5,813,221 entitled "Augmenter with Integrated Fueling and Cooling") for an example of the fuel injectors. The fuel injectors provide fuel for combustion in combustion zone 44 for thrust augmentation.

The exhaust section 126 includes an annular exhaust casing 36 disposed coaxially with and suitably attached to the corresponding engine casing 21 and surrounding an exhaust flowpath 128. Mounted to the aft end of the exhaust casing 36 is a conventional variable area converging-diverging exhaust nozzle 38 through which the bypass air 26 and core gases 28 are discharged during operation. The exhaust section 126 further includes an annular exhaust combustion liner 40 spaced radially inwardly from the exhaust casing 36 to define therebetween an annular cooling duct 42 disposed in flow communication with the bypass duct 24 for receiving therefrom a portion of the bypass air 26. The exhaust section 126 of the engine is by definition located aft of the turbines.

An exhaust section combustion zone 44 within the exhaust flowpath 128 is located radially inwardly from the exhaust liner 40 and the bypass duct 24 and downstream or aft of the core engine 13 and the low pressure turbine 22. An annular radially outer diffuser wall 46 is circumscribed around the diffuser duct 33 and is axially spaced apart from a forward end 35 of the combustion liner 40 inside the casing 36. Thus, the combustion zone 44 located radially inwardly from the bypass duct 24 and downstream and aft of the mixer 31 and bypass duct outlet 27. The diffuser wall 46 also defines an annular inner inlet 49 for passing the core gases 28 from the core outlet 30 into the combustion zone 44.

An aftwardly converging centerbody 48 extends aft and downstream from the core outlet 30 and partially into the exhaust section 126 of the engine 10. The diffuser duct 33 is radially inwardly bounded by the centerbody 48 and radially outwardly bounded by the diffuser wall 46 and serves to decrease the velocity of the core gases 28 as they enter the exhaust section 126.

Figure 2:
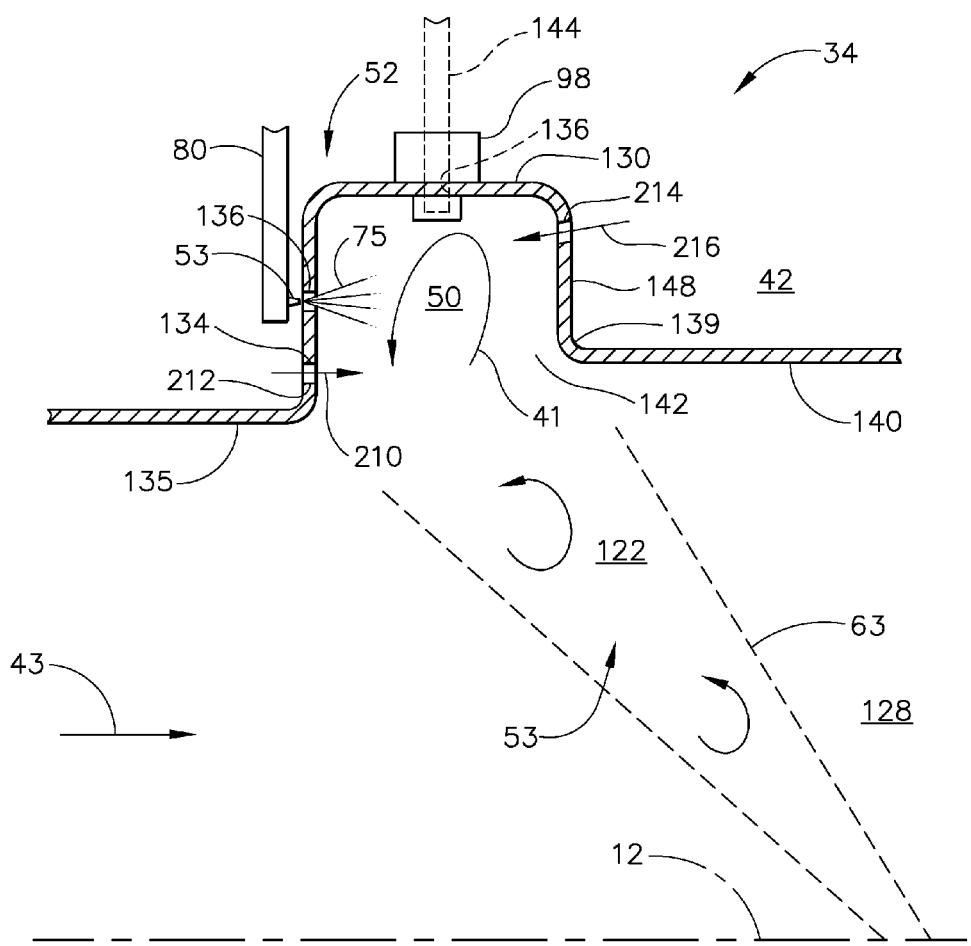
FIG. 2 is an enlarged sectional view illustration of the segmented trapped vortex cavity illustrated in FIG. 1.

Referring to FIGS. 1 and 2, the trapped vortex cavity afterburner 34 is disposed downstream of the low pressure turbine 22 and includes at least one annular segmented trapped vortex cavity 50 for injecting a fuel/air mixture 53 into the engine downstream of the low pressure turbine 22 and into the combustion zone 44 as illustrated in FIG. 2. The trapped vortex cavity afterburner 34 is disposed downstream of the low pressure turbine 22 and is a source of reheat for augmenting the thrust of the nozzle 38. The trapped vortex cavity afterburner 34 is for pilot ignition and stabilizing combustion in the exhaust gas flow 43. It provides reliable thrust augmentation and complete combustion of the thrust augmenting fuel 75 used by the engine 10 for thrust augmentation or afterburning.

The fuel/air mixture is 53 ignited by an igniter 98 and the resulting flame is stabilized by the action of the annular segmented trapped vortex cavity 50. The segmented trapped vortex cavity 50 is utilized to produce an annular rotating vortex 41 of the fuel/air mixture. The segmented trapped vortex cavity 50 is positioned with respect to the combustion zone 44 such that there is an aftwardly tapering frusto-conical path 63 from the cavity towards the centerline axis 12 in the combustion zone along which the combusting fuel/air mixture 53 is injected into the combustion zone 44. The air/fuel mixture 53 is in the shape of a conical vortex sheet generated from within the cavity and ignited by the igniter 98 positioned within or adjacent to the segmented trapped vortex cavity 50.

Figure 3:
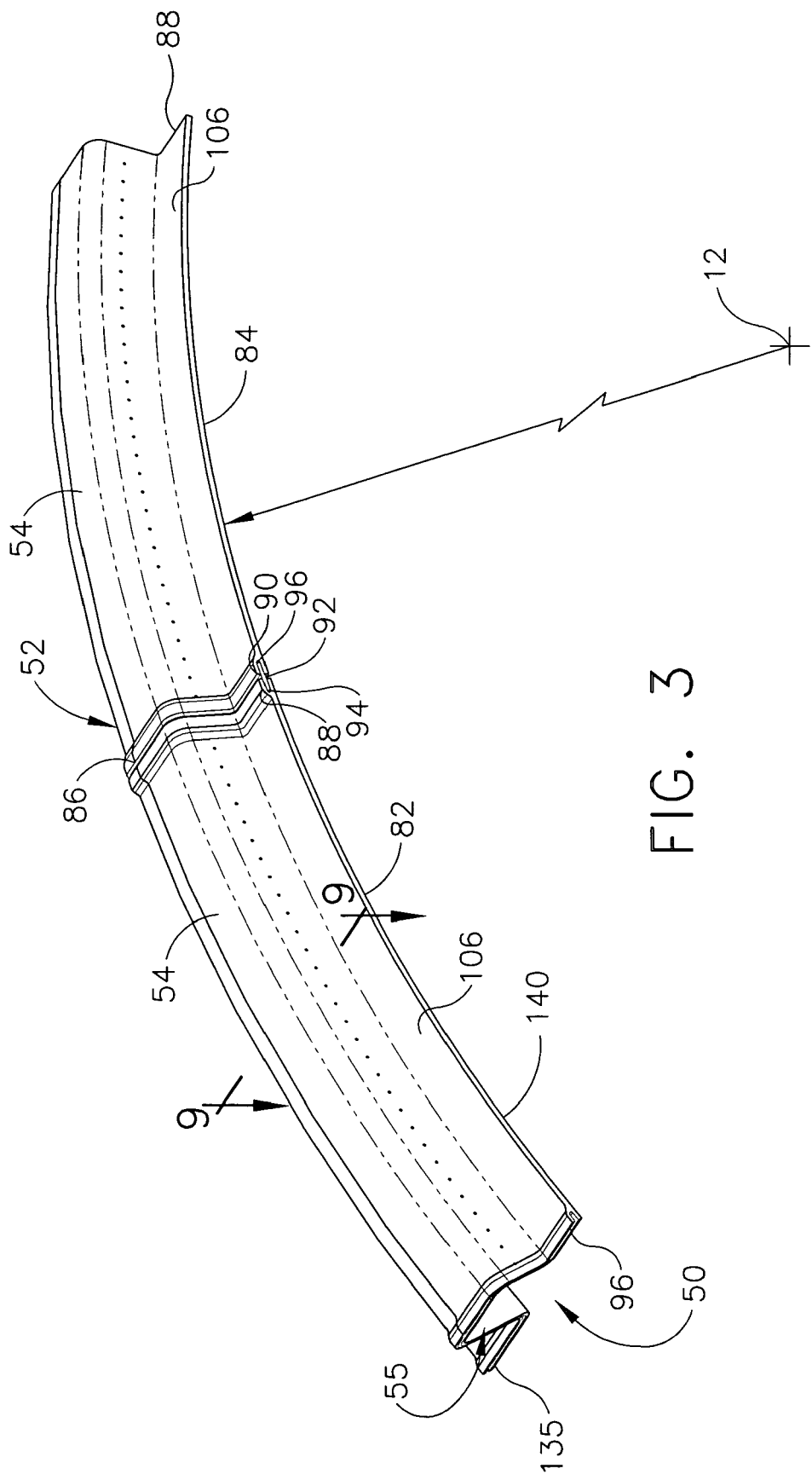
FIG. 3 is a perspective view illustration of a couple of segments of the segmented trapped vortex cavity illustrated in FIG. 2.

Referring to FIGS. 1 and 3, the exemplary embodiment of the segmented trapped vortex cavity 50 illustrated herein includes annular cavity segments 55 circumferentially disposed about the centerline axis 12. The segmented trapped vortex cavity 50 is contained within an annular segmented vortex cavity assembly 52 which includes a full ring of annular trapped vortex cavity assembly segments 54 circumferentially disposed about the centerline axis 12. Referring to FIG. 2, each assembly segment 54 includes a cavity forward wall 134 extending radially outwardly from a forward flange 135 and a cavity aft wall 148 extending radially outwardly from an aft flange 140. A cavity radially outer wall 130 extends between the cavity forward and aft walls 134, 148 defining a cavity segment 55 therebetween. A cavity opening 142 extends between the cavity forward and aft walls 134 and 148 at a radially inner end 139 of the assembly segment 54. The cavity opening 142 is open to combustion zone 44 and is spaced radially apart and inwardly of the cavity radially outer wall 130. Vortex driving aftwardly injected air 210 from the bypass air 26 is injected through air injection first holes 212 through the cavity forward wall 134 at a radial position along the forward wall near the opening 142 at the radially inner end 139 of the trapped vortex cavity assembly segment 54. Vortex driving forwardly injected air 216 is injected through air injection second holes 214 in the cavity aft wall 148 positioned radially near the cavity radially outer wall 130.

Referring to FIGS. 1 and 2, the annular segmented trapped vortex cavity 50 faces radially inwardly towards the centerline axis 12 in the combustion zone 44 so as to be in direct unobstructed fluid communication with the combustion zone 44. The segmented annular trapped vortex cavity 50 is located aft and downstream of the mixer 31 at a radially outer portion 122 of the combustion zone 44 for maximizing flame ignition and stabilization in the combustion zone 44 during thrust augmentation or reheat using fuel injected by the fuel injectors 39. Fuel may be introduced into the segmented trapped vortex cavity 50 at one or more locations.

A first vortex fuel tube 80 extending radially inwardly may be used to inject fuel into the segmented vortex cavity 50 though a fuel hole in the tube and into the segmented vortex cavity 50 through a fuel aperture 136 in the forward wall 134 of the vortex cavity assembly 52. A second alternative or supplemental vortex fuel tube 144, illustrated in dashed line, extending radially inwardly to a point just radially outwardly of the radially outer wall 130 of the vortex cavity assembly 52 may also be used. The second vortex fuel tube 144 is operable to inject fuel into the vortex cavity 50 through one or more fuel apertures 136, also illustrated in dashed line, in the radially outer wall 130 of the vortex cavity assembly 52. Some of the bypass air 26 flows through the fuel apertures 136 helping to inject the fuel into the trapped vortex cavity 50.

The igniter 98 is disposed through the cavity radially outer wall 130 and is operable to ignite the annular rotating vortex 41 of the fuel and air mixture and spread a flame front into the combustion zone 44. Two or more circumferentially spaced apart igniters 98 may be used. The trapped vortex cavity 50 may serve as an afterburner or augmentor to provide additional thrust for the engine by increasing the temperature of the mixture of the core gases 28 and the bypass air 26 flowing from the bypass duct 24 and through the mixer 31 into the combustion zone 44. The trapped vortex cavity 50 may also be used for sustaining and stabilizing combustion in the afterburner or augmentor to provide reliable operation of afterburner. The igniter 98 may not always be needed. Suitable igniters include conventional electric spark igniters (spark plugs) and, more recent, radiative plasma ignition means such as those illustrated in U.S. Pat. Nos. 5,367,871, 5,640,841, 5,565,118, and 5,442,907. In some cases, the core gases 28 from the core outlet 30 flowing into the combustion zone 44 may be hot enough to ignite the fuel/air mixture of the vortex sheet.

Figure 4:
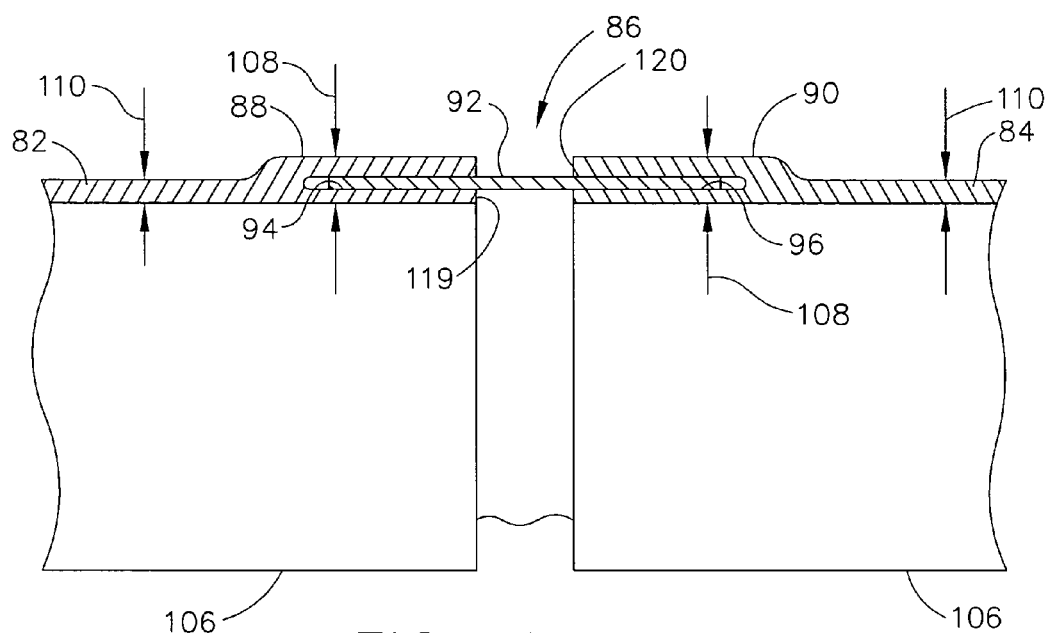
FIG. 4 is a perspective view illustration of an expansion joint between ends of the segments of the segmented trapped vortex cavity illustrated in FIG. 3.

Illustrated in FIG. 3 are first and second adjacent segments 82, 84 of the annular trapped vortex cavity assembly segments 54 of the vortex cavity assembly 52 and which form the segmented annular trapped vortex cavity 50. An expansion joint 86 is disposed between adjacent first and second ends 88, 90 of the first and second adjacent segments 82, 84 respectively. The expansion joint 86 illustrated in FIG. 4 is a spline seal including a slip seal 92, such as a sheet metal seal, disposed in first and second seal slots 94, 96 in circumferentially oppositely facing first and second edges 119, 120 of the adjacent first and second ends 88, 90 of the first and second adjacent segments 82, 84 respectively.

The slip seal 92 circumferentially extends and seals between the adjacent first and second ends 88, 90. Each of the trapped vortex cavity assembly segments includes a center section 106 between the first and second ends 88, 90 of each of the assembly segments as illustrated in FIGS. 3 and 4. The distal first and second ends 88, 90 of each of the trapped vortex cavity assembly segments have end thicknesses 108 which are thicker than a center section thickness 110 of the center section 106. The ends are thicker to accommodate the first and second seal slots 94, 96 in the first and second ends 88, 90. The enlarged end thicknesses 108 and the first and second seal slots 94, 96 serve as exemplary first and second expansion joint features at the distal first and second ends 88, 90 of the trapped vortex cavity annular assembly segment.

Figure 5:
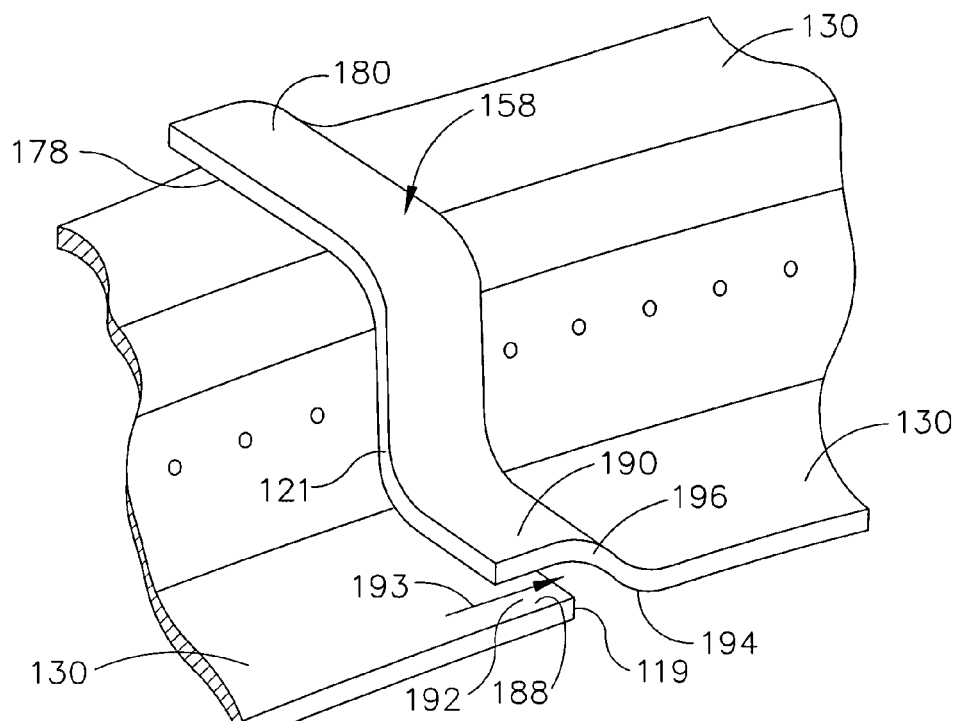
FIG. 5 is a perspective view illustration of an alternative expansion joint at the ends of the segments of the segmented trapped vortex cavity illustrated in FIG. 3.
Figure 6:
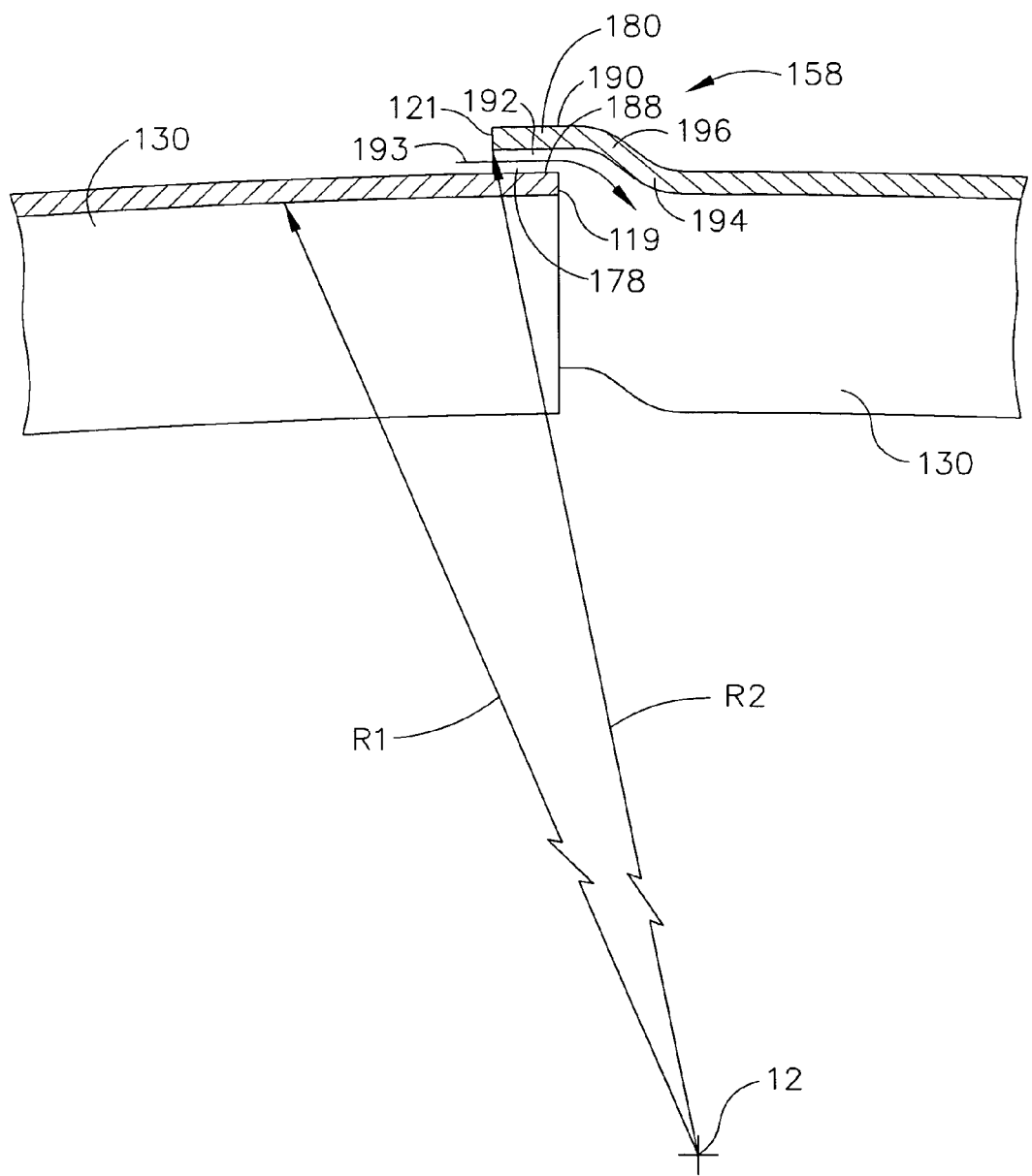
FIG. 6 is an enlarged perspective view illustration of a portion of the alternative expansion joint illustrated in FIG. 5.

One alternative expansion joint illustrated in FIG. 5 is a cooling expansion joint 158 including a first unflared end 188 overlapped by and radially spaced apart from a second flared end 190. The second flared end 190 is an expansion joint feature. At least a first portion 178 of the cavity radially outer wall 130 in the first unflared end 188 is radially spaced apart from at least a second portion 180 of the cavity radially outer wall 130 in the second flared end 190 forming a cooling air slot 192 radially therebetween through which cooling air flow 193 passes through. The second flared end 190, as illustrated in FIG. 5, is connected to the center section 106 by radially inner and outer bends 194, 196. The cavity radially outer wall 130 at the first and second ends and the circumferentially oppositely facing first and second edges in the first and second ends are spaced radially apart at first and second radii R1, R2 respectively from the axial centerline axis 12 as illustrated in FIG. 6. R2 is illustrated as greater than R1.

Figure 7:
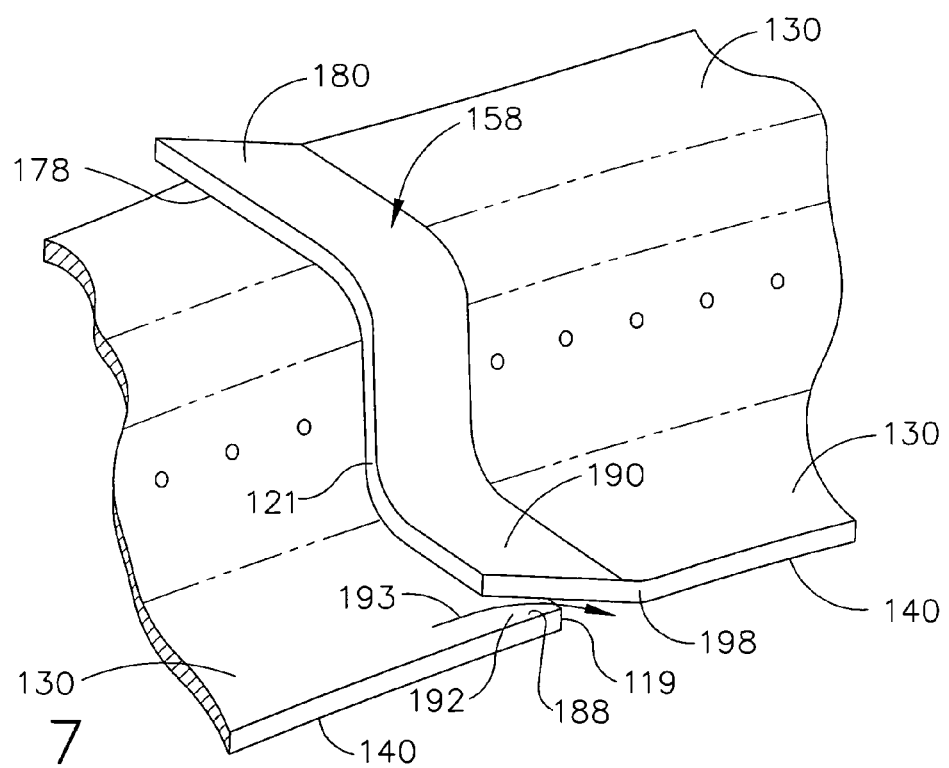
FIG. 7 is a perspective view illustration of another alternative expansion joint between the ends of the segments of the segmented trapped vortex cavity illustrated in FIG. 3.
Figure 8:
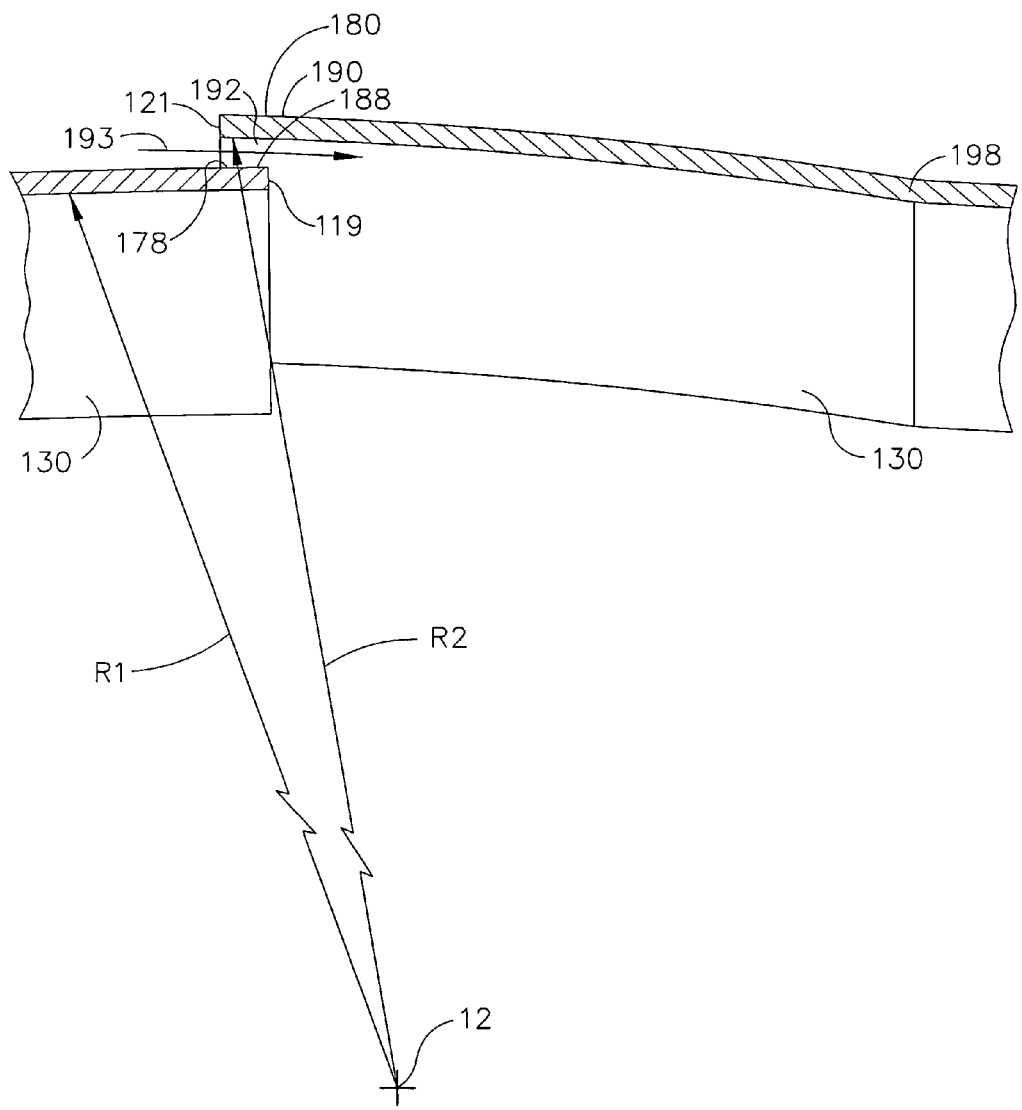
FIG. 8 is an enlarged perspective view illustration of a portion of the alternative expansion joint illustrated in FIG. 7.

Another alternative expansion joint illustrated in FIG. 7 is a first unflared end 188 overlapped by and radially spaced apart from a second flared end 190 forming a cooling air slot 192 radially therebetween through which cooling air flow 193 passes through. The second flared end 190 is connected to the center section 106 by a single acute angle bend 198 illustrating yet another expansion joint feature. The cavity radially outer wall 130 at the first and second ends and the circumferentially oppositely facing first and second edges in the first and second ends are spaced radially apart at first and second radii R1, R2 from the axial centerline axis 12 as illustrated in FIG. 8. R2 is illustrated as greater than R1. The cooling air slots 192 of both alternative expansion joints illustrated in FIGS. 5-8 can be designed to aid in part in cooling of the trapped vortex cavity segments while helping to energize the formation of the vortex.

Figure 9:
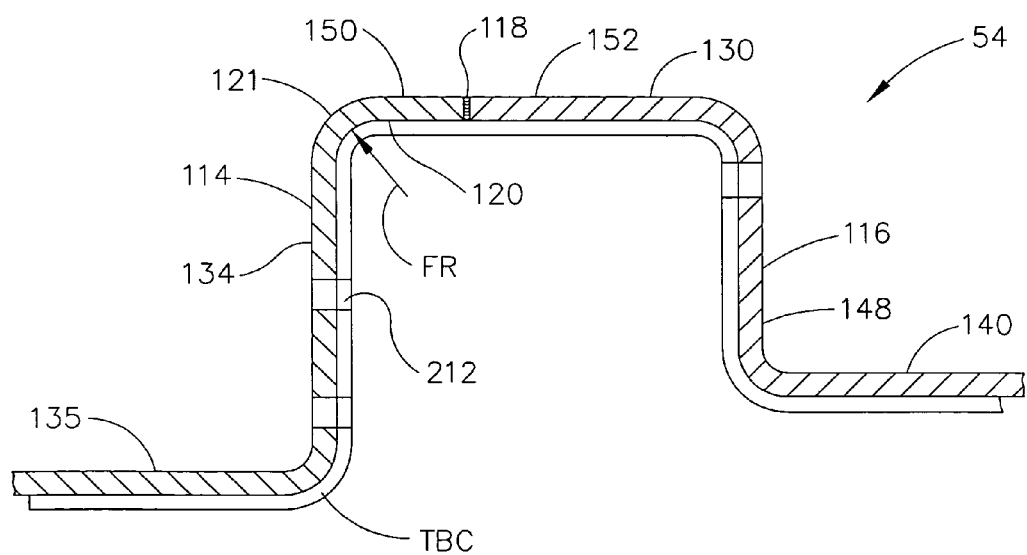
FIG. 9 is an axial sectional view illustration taken through 9-9 of the segment illustrated in FIG. 3.

The exemplary embodiment of the trapped vortex cavity assembly segment 54 illustrated in FIG. 9 includes forward and aft subcomponents 114, 116 that are welded together or otherwise suitably attached together as indicated by weld 118. The forward subcomponent 114 includes the cavity forward wall 134 and the aft subcomponent 116 includes the cavity aft wall 148. The cavity radially outer wall 130 is split between the forward and aft subcomponents 114, 116 indicated by forward and aft portions 150, 152 of the cavity radially outer wall 130 being part of the forward and aft subcomponents 114, 116 respectively. Each of the forward and aft subcomponents 114, 116 can be drilled and sprayed with one or more thermal barrier coatings TBC. The weld 118 can also be located approximately near a tangent point 120 of a fillet radius FR of fillet between the cavity radially outer wall 130 and the cavity forward wall 134, as illustrated herein, or the cavity aft wall 148. This could eliminate the TBC requirement. Once the forward and aft subcomponents 114, 116 are welded, the TBC may no longer be required due to the cooling effects of cooling air injected through the air injection first holes 212 through the cavity forward wall 134.

The segmented structure of the vortex cavity assembly 52 over a 360 degree ring structure reduces stresses provides a less expensive method of manufacturing and repairing the vortex cavity assembly 52. Manufacturing the vortex cavity assembly 52 in segments results in reduction of structural and thermal stresses, reducing manufacturing expenses in all phases of manufacturing, and improved hardware durability.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. An annular trapped vortex cavity segment comprising:
   a cavity forward wall, a cavity radially outer wall, and a cavity aft wall defining a cavity segment therebetween,
   a cavity opening extending between the cavity forward and aft walls at a radially inner end of the segment,
   a center section extending between circumferentially spaced apart distal first and second ends of the annular trapped vortex cavity segment, and
   radially spaced apart pluralities of air injection first and second holes through the cavity forward and aft walls respectively.

2. A segment as claimed in claim 1 further comprising first and second expansion joint features at the distal first and second ends respectively.

3. A segment as claimed in claim 2 wherein the first and second expansion joint features include first and second slots in circumferentially oppositely facing first and second edges of the first and second ends respectively.

4. A segment as claimed in claim 3 further comprising the center section having a center section thicknesses and the first and second ends having end thicknesses thicker than the center section thickness.

5. A segment as claimed in claim 2 wherein the first and second expansion joint features include the first end being unflared and the second end being flared.

6. A segment as claimed in claim 5 further comprising the second flared end being connected to the center section by radially inner and outer bends.

7. A segment as claimed in claim 5 further comprising the second flared end being connected to the center section by a single acute angle bend.

8. A segment as claimed in claim 1 further comprising:
   attached forward and aft subcomponents,
   the forward subcomponent including the cavity forward wall,
   the aft subcomponent including the cavity aft wall, and
   the forward and aft subcomponents including forward and aft portions of the cavity radially outer wall respectively.

9. A segment as claimed in claim 8 further comprising the forward and aft subcomponents being welded together.

10. A segment as claimed in claim 8 further comprising the forward and aft subcomponents being attached together approximately near or at a tangent point of a fillet radius of a fillet between the cavity radially outer wall and the cavity forward wall.

11. A segment as claimed in claim 10 further comprising the forward and aft subcomponents being welded together.

12. A segment as claimed in claim 8 further comprising first and second expansion joint features at the distal first and second ends respectively.

13. A segment as claimed in claim 12 wherein the first and second expansion joint features include first and second slots in circumferentially oppositely facing first and second edges of the first and second ends respectively.

14. A segment as claimed in claim 13 further comprising the center section having a center section thicknesses and the first and second ends having end thicknesses thicker than the center section thickness.

15. A segment as claimed in claim 12 wherein the first and second expansion joint features include the first end being unflared and the second end being flared.

16. A segment as claimed in claim 15 further comprising the second flared end being connected to the center section by radially inner and outer bends.

17. A segment as claimed in claim 16 further comprising the forward and aft subcomponents being welded together.

18. A segment as claimed in claim 16 further comprising the forward and aft subcomponents being welded or otherwise attached together approximately near or at a tangent point of a fillet radius of a fillet between the cavity radially outer wall and the cavity forward wall.

19. A segment as claimed in claim 15 further comprising the second flared end being connected to the center section by a single acute angle bend.

20. A segment as claimed in claim 19 further comprising the forward and aft subcomponents being welded or otherwise attached together approximately near or at a tangent point of a fillet radius of a fillet between the cavity radially outer wall and the cavity forward wall.

21. An annular segmented vortex cavity assembly comprising:
- a ring of annular trapped vortex cavity assembly segments circumferentially disposed about an axis,
- a segmented trapped vortex cavity within the ring of annular trapped vortex cavity assembly segments,
- each of the annular trapped vortex cavity assembly segments including a cavity forward wall, a cavity radially outer wall, and a cavity aft wall defining a cavity segment therebetween,
- a cavity opening extending between the cavity forward and aft walls at a radially inner end of the assembly segment, and
- radially spaced apart pluralities of air injection first and second holes through the cavity forward and aft walls respectively.

22. An assembly as claimed in claim 21 further comprising a center section extending between circumferentially spaced apart distal first and second ends of each of the annular trapped vortex cavity assembly segments and an expansion joint disposed between each pair of first and second adjacent segments of the annular trapped vortex cavity assembly segments.

23. An assembly as claimed in claim 22 wherein the expansion joint includes a slip seal disposed in first and second slots in circumferentially oppositely facing first and second edges of the first and second ends respectively of the pair of first and second adjacent segments.

24. An assembly as claimed in claim 23 further comprising the center section having a center section thicknesses and the first and second ends having end thicknesses thicker than the center section thickness.

25. An assembly as claimed in claim 22 further comprising the first end of the second adjacent segment being unflared and the second end of the first adjacent segment being flared.

26. An assembly as claimed in claim 25 further comprising at least a first portion of the cavity radially outer wall in the first unflared end radially spaced apart from at least a second portion of the cavity radially outer wall in the second flared end and a cooling air slot located radially between the first and second portions at each of the joints.

27. An assembly as claimed in claim 25 further comprising the second flared end of each of the segments being connected to the center section by radially inner and outer bends.

28. An assembly as claimed in claim 25 further comprising the second flared end of each of the segments being connected to the center section by a single acute angle bend.

29. An assembly as claimed in claim 21 further comprising:
- each of the segments having attached forward and aft subcomponents,
- the forward subcomponent including the cavity forward wall,
- the aft subcomponent including the cavity aft wall, and
- the forward and aft subcomponents including forward and aft portions of the cavity radially outer wall respectively.

30. An assembly as claimed in claim 29 further comprising the forward and aft subcomponents being welded or otherwise attached together.

31. An assembly as claimed in claim 29 further comprising the forward and aft subcomponents being attached together approximately near or at a tangent point of a fillet radius of a fillet between the cavity radially outer wall and the cavity forward wall.

32. An assembly as claimed in claim 31 further comprising the forward and aft subcomponents being welded or otherwise attached together.

33. An assembly as claimed in claim 29 further comprising a center section extending between distal first and second ends of each of the annular trapped vortex cavity assembly segments and an expansion joint disposed between each pair of first and second adjacent segments of the annular trapped vortex cavity assembly segments.

34. An assembly as claimed in claim 33 wherein the expansion joint includes a slip seal disposed in first and second slots in circumferentially oppositely facing first and second edges of the first and second ends respectively of the pair of first and second adjacent segments.

35. An assembly as claimed in claim 34 further comprising the center section having a center section thicknesses and the first and second ends having end thicknesses thicker than the center section thickness.

36. An assembly as claimed in claim 33 further comprising the first end of the second adjacent segment being unflared and the second end of the first adjacent segment being flared.

37. An assembly as claimed in claim 36 further comprising at least a first portion of the cavity radially outer wall in the first unflared end radially spaced apart from at least a second portion of the cavity radially outer wall in the second flared end and a cooling air slot located radially between the first and second portions at each of the joints.

38. An assembly as claimed in claim 36 further comprising the second flared end of each of the segments being connected to the center section by radially inner and outer bends or by a single acute angle bend.

39. An assembly as claimed in claim 36 further comprising at least a first portion of the cavity radially outer wall in the first unflared end radially spaced apart from at least a second portion of the cavity radially outer wall in the second flared end and a cooling air slot located radially between the first and second portions.

40. An assembly as claimed in claim 39 further comprising the second flared end being connected to the center section by radially inner and outer bends or by a single acute angle bend.

* * * * *